(12) United States Patent
Chen (10) Patent No.: US 7,786,677 B2
(45) Date of Patent: Aug. 31, 2010

(54) CONTROL CIRCUIT FOR TURNING ON/OFF AUTOMOBILE LIGHTS

(76) Inventor: Kuang-Hou Chen, No. 22, Lane 32, Longmi Rd., Bali Township, Taipei County (TW)

( * ) Notice: Subject to any disclaimer, the term of this patent is extended or adjusted under 35 U.S.C. 154(b) by 288 days.

(21) Appl. No.: 12/081,510

(22) Filed: Apr. 17, 2008

(65) Prior Publication Data

US 2009/0261731 A1    Oct. 22, 2009

(51) Int. Cl.
B60Q 1/02    (2006.01)
(52) U.S. Cl. .......................... 315/82; 307/10.8
(58) Field of Classification Search .................. 315/77, 315/82; 307/10.1, 10.6, 10.8
See application file for complete search history.

(56) References Cited

U.S. PATENT DOCUMENTS 3,881,128 A * 4/1975 Douglas et al. ............... 315/83
3,909,661 A * 9/1975 Grossenbacher ............. 315/82
3,963,940 A * 6/1976 Adamian ................... 307/10.8
4,899,083 A * 2/1990 Kataoka et al. ............... 315/77
7,075,237 B2 * 7/2006 Sato et al. ..................... 315/82

* cited by examiner

Primary Examiner—Thuy Vinh Tran
(74) Attorney, Agent, or Firm—Bacon & Thomas, PLLC (57) ABSTRACT

A control circuit for turning on/off automobile lights is connected to first, second and third power output units and an input trigger circuit. When a car is started, the second power output unit supplies power to the control circuit. Thereafter, the third power output unit supplies power to the control circuit for each time when the input trigger circuit is conducted electrically. The control circuit is selectively disconnected from the first power output unit to allow the first power output unit to supply power to turn on the automobile lights. Since the control circuit cannot receive the power from the second power output unit immediately when the engine is turned off, the control circuit will prohibit the first power output unit to supply power to the automobile lights and turn off the automobile lights.

10 Claims, 5 Drawing Sheets

CONTROL CIRCUIT FOR TURNING ON/OFF AUTOMOBILE LIGHTS

FIELD OF THE INVENTION

The present invention relates to a control circuit, and more particularly to a control circuit for turning on/off automobile lights.

BACKGROUND OF THE INVENTION

As the living standard improves and the economy blooms, more people living in cities use cars for their transportations and drive to work or go out for fun more often. In busy lanes, drivers have to follow the rules and regulations as set forth by traffic laws strictly to avoid car accidents. As specified in basic traffic laws and regulations, drivers should use the signal lights properly to indicate the position and the driving direction of their car to avoid car accidents.

To assure a safe driving condition, drivers have to turn on the headlights when driving in a dark area or at nighttime to provide sufficient light and remind drivers to watch out for the road conditions. From the description above, we know that headlights are absolutely important to cars, and thus related automobile manufacturers put up tremendous efforts on the development of the headlights. Some manufacturers build a light sensor in the headlight of a car, such that when we drive a car in a dark environment, the light sensor will automatically detect the darkness and supply a power source of the battery to the headlights for the illumination. On the other hand, when we drive a car in a bright environment, the light sensor will automatically detect the bright environment and disconnect the power source of battery, such that power will not be supplied to the headlights through the light sensor. Drivers can also turn on the headlights manually for the illumination, and thus the light sensor can bring tremendous convenience to the driver, and thus the light sensors are used and installed in cars extensively.

However, if a driver turns on a headlight manually while driving the car, the driver may forget to turn off the headlight after parking the car, and the power source of the battery is supplied continuously to the headlights until the power source of battery runs out, and the driver cannot start the car again since the power source of the battery is exhausted. It is good news for consumers to hear that related automobile manufacturers provide a device for turning on the headlights automatically when a car is started, and turning off the headlights automatically when the engine is turned off.

SUMMARY OF THE INVENTION

In view of the foregoing shortcomings of the prior art that headlights keep consuming the power source of a battery to produce lights after a car is turned off, and drivers cannot start their car since the power of the battery is exhausted, the inventor of the present invention based on years of experience in the related industry to conduct extensive researches and experiments, and finally developed a control circuit for turning on/off automobile lights in accordance with the present invention to overcome the shortcomings of the prior art.

It is a primary objective of the present invention to provide a control circuit for turning on/off automobile lights, and the control circuit is connected among a first power output unit (such as a battery), a second power output unit, a third power output unit and a plurality of automobile lights of a car, wherein the control circuit comprises an input trigger circuit coupled to the third power output unit. If the control circuit is situated at a state of starting a car, the second power output unit keeps supplying a second power source to the control circuit. Thereafter, a third power source of the third power output unit is supplied to the control circuit for each time when the input trigger circuit is electrically conducted, so that the control circuit is at a state of disconnecting a first power source of the first power output unit supplied to the automobile lights, and allowing the first power output unit to supply the first power source to the automobile lights to turn on the automobile lights. The control circuit cannot receive the second power source from the second power output unit immediately when the engine is turned off, and thus the control circuit will prohibit the first power output unit to supply the first power source to the automobile lights to turn off the automobile lights. When the car is started, drivers can turn on/off the automobile lights through the control circuit. When the engine is off, the control circuit will automatically turn off the automobile lights to overcome the shortcomings of the prior art that the headlights keep on producing lights and exhaust the power source of the battery after the car is turned off.

DETAILED DESCRIPTION OF THE PREFERRED EMBODIMENTS

Figure 1:
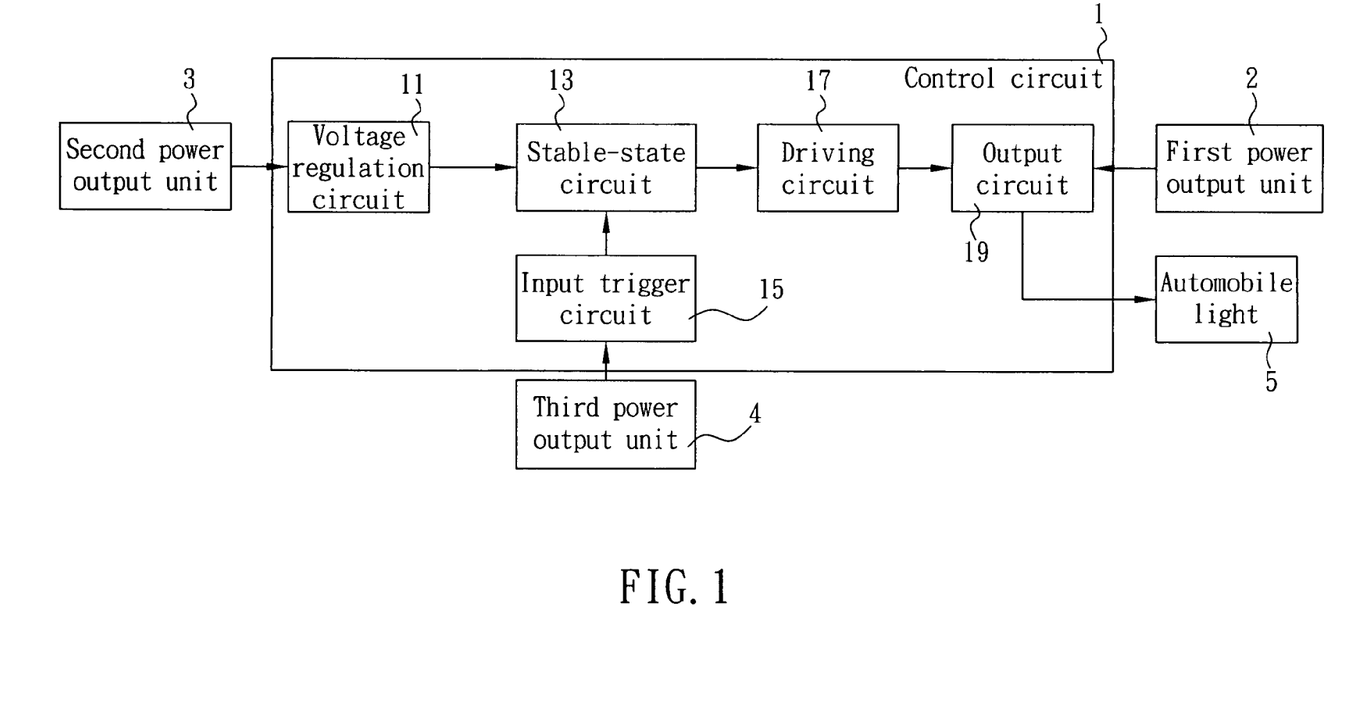
FIG. 1 is a schematic block diagram of a control circuit for turning on/off automobile lights in accordance with the present invention.

Referring to FIG. 1 for a control circuit for turning on/off automobile lights in accordance with the present invention, the control circuit 1 is coupled among a first power output unit 2 (such as a battery), a second power output unit 3 (such as an automobile power distribution circuit, a DC motor or an electronic control unit (ECU)), a third power output unit 4 (such as a battery or an ECU) and a plurality of automobile lights 5 of a car (not shown in the figure), wherein the control circuit 1 comprises a voltage regulation circuit 11, a stable-state circuit 13, an input trigger circuit 15, a driving circuit 17 and an output circuit 19. The voltage regulation circuit 11 is coupled separately to the second power output unit 3 and the stable-state circuit 13, and the stable-state circuit 13 is coupled separately to the input trigger circuit 15 and the driving circuit 17, and the output circuit 19 is coupled among the driving circuit 17, the first power output unit 2 and the automobile lights 5. Further, the input trigger circuit 15 is coupled to the third power output unit 4. If the control circuit 1 is at a state of starting a car, a second power source of the second power output unit 3 is supplied continuously to the voltage regulation circuit 11. Thereafter, a third power source of the third power output unit 4 is supplied to the input trigger circuit 15 for each time when the input trigger circuit 15 is electrically conducted to generate and output a first trigger signal to the stable-state circuit 13. After the stable-state circuit 13 receives the second power source and the first trigger signal, the stable-state circuit is electrically conducted to generate and output a second trigger signal to the driving circuit 17, and the driving circuit 17 receives the second trigger signal to trigger the second trigger circuit to a conducting state to generate and output a third trigger signal to the output circuit 19, and the output circuit 19 is triggered to a conducting state by the third trigger signal, so that a first power source of the first power output unit 2 is supplied to the automobile lights 5 through the output circuit 19.

If the car is started, the control circuit 1 receives the second power source and the third power source. Therefore, the control circuit 1 is situated at a state of prohibiting the first power source to be inputted to the automobile lights 5 and allowing the first power output unit 2 to supply the first power source to the automobile lights 5 for the illumination. If the control circuit 1 is at a state of turning off the car, the control circuit 1 cannot receive the second power source of the second power output unit 3 immediately, and the control circuit 1 will prohibit the first power output unit 2 to supply the first power source to the automobile lights 5, and thus the automobile lights 5 are turned off.

Figure 2:
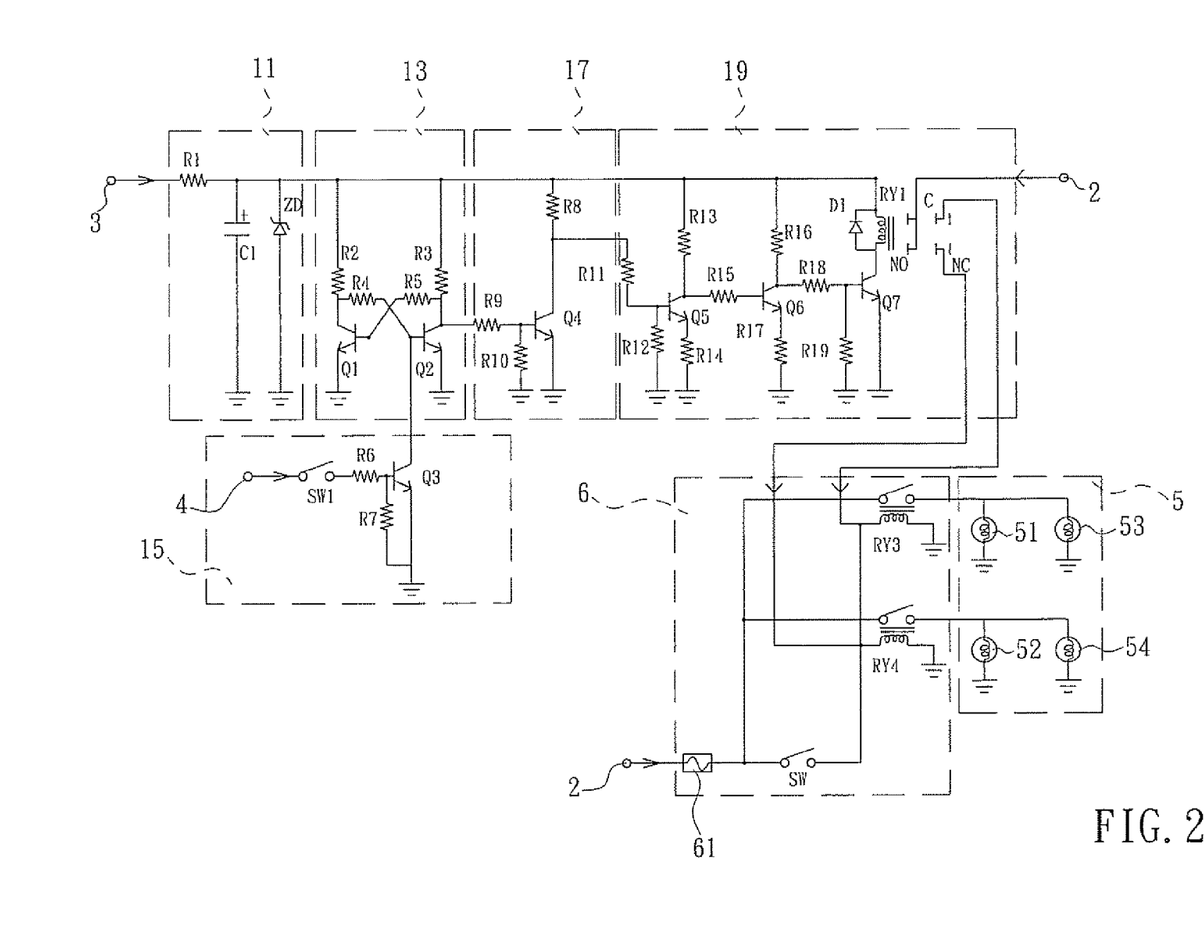
FIG. 2 is a schematic view of a control circuit for turning on/off automobile lights in accordance with a first preferred embodiment of the present invention.

Referring to FIGS. 1 and 2 for a first preferred embodiment of the present invention, the voltage regulation circuit 11 comprises a first resistor R1, a Zener diode ZD and a first capacitor C1, wherein a terminal of the first resistor R1 is coupled to the second power output unit 3 (such as a power distribution circuit, an electronic control unit (ECU) of a DC motor or an electric generator in a car), and another terminal of the first resistor R1 is coupled to a terminal of the first capacitor C1, and another terminal of the first capacitor C1 is coupled to a ground terminal, and a terminal of the Zener diode ZD is coupled among another terminal of the first resistor R1, a terminal of the first capacitor C1, and the stable-state circuit 13, and another terminal of the Zener diode ZD is coupled to the ground terminal. If a power source is outputted directly to the voltage regulation circuit 11, the second power source (such as an IGN and ACC power source of a power distribution circuit in a car or an ECU power source) will be stabilized at a constant voltage by the voltage regulation circuit 11, so that the voltage regulation circuit 11 can supply a stable power source to the stable-state circuit 13, the input trigger circuit 15, the driving circuit 17 and the output circuit 19 to protect the control circuit 1 sequentially.

Referring to FIGS. 1 and 2 for the first preferred embodiment, the stable-state circuit 13 comprises a second resistor R2, a third resistor R3, a fourth resistor R4, a fifth resistor R5, a first transistor Q1, and a second transistor Q2, wherein a terminal of the second resistor R2 is coupled between a terminal of the Zener diode ZD and the driving circuit 17, and a terminal of the third resistor R3 is coupled between another terminal of the second resistor R2 and the driving circuit 17, and a terminal of the fourth resistor R4 is coupled to another terminal of the second resistor R2, and a terminal of the fifth resistor R5 is coupled between another terminal of the third resistor R3 and the driving circuit 17, and a collector of the first transistor Q1 is coupled between another terminal of the second resistor R2 and a terminal of the fourth resistor R4, and a base of the first transistor Q1 is coupled to another terminal of the fifth resistor R5, and an emitter of the first transistor Q1 is coupled to the ground terminal, and a collector of the second transistor Q2 is coupled among another terminal of the third resistor R3 and a terminal of the fifth resistor R5, and the driving circuit 17, and a base of the second transistor Q2 is coupled between another terminal of the fourth resistor R4 and the input trigger circuit 15, and an emitter of the second transistor Q2 is coupled to the ground terminal, such that the stable-state circuit 13 receives a first trigger signal of the input trigger circuit 15, and the voltage regulation circuit 11 receives a second power source (such as IGN and ACC power source and ECU power source transmitted by a power distribution circuit in a car) to produce a potential difference between the first transistor Q1 and the second transistor Q2 and generate a second trigger signal, and output the second trigger signal to the driving circuit 17. In other words, the stable-state circuit 13 is maintained at a conducting state to continuously sending out the second trigger signal. If the control circuit 1 is turned off and it is necessary to turn on the control circuit, the stable-state circuit 13 will disconnect the second power source by the voltage regulation circuit 11 (such as a RESET function), and the stable-state circuit 13 will receive the first trigger signal again, and is electrically conducted to output the second trigger signal to the driving circuit 17.

In the first preferred embodiment of the present invention, the input trigger circuit 15 as shown in FIG. 2 comprises a first input switch SW1, a sixth resistor R6, a seventh resistor R7 and a third transistor Q3, wherein the first input switch SW1 is an ignition switch (such as a key-hole type ignition switch) in a car or installed in the car and operated together with an ignition switch. A terminal of the first input switch SW1 is coupled to a third power output unit 4 (such as a battery), and a terminal of the sixth resistor R6 is coupled to another terminal of the first input switch SW1, and a terminal of the seventh resistor R7 is coupled to another terminal of the sixth resistor R6, and another terminal of the seventh resistor R7 is coupled to the ground terminal, and a base of the third transistor Q3 is coupled between another terminal of the sixth resistor R6 and a terminal of the seventh resistor R7, and an emitter of the third transistor Q3 is coupled to the ground terminal, and a collector of the third transistor Q3 is coupled between the second transistor Q2 and another terminal of the fourth resistor R4. If the first input switch SW1 is electrically conducted, a car engine will start its operation and drive a DC motor to generate the third power source, and the third power source is passed through the first input switch SW1 and the third transistor Q3 sequentially to produce a potential difference in the third transistor Q3 and triggered to a conducting state to generate a first trigger signal.

In the first preferred embodiment, the driving circuit 17 as shown in FIG. 2 comprises an eighth resistor R8, a ninth resistor R9, a tenth resistor R10 and a fourth transistor Q4, wherein a terminal of the eighth resistor R8 is coupled to a terminal of the third resistor R3 and the output circuit 19, and a terminal of the ninth resistor R9 is coupled among a collector of the second transistor Q2, another terminal of the third resistor R3 and a terminal of the fifth resistor R5, and a terminal of the tenth resistor R10 is coupled to the ground terminal, and a base of the fourth transistor Q4 is coupled between another terminal of the ninth resistor R9 and another terminal of the tenth resistor R10, and an emitter of the fourth transistor Q4 is coupled to the ground terminal, and a collector of the fourth transistor Q4 is coupled between another terminal of the eighth resistor R8 and the output circuit 19. If the second power source processed by the stable-state circuit 13 is sent to the driving circuit 17, the second trigger signal of the stable-state circuit 13 will be outputted to the fourth transistor Q4, so that the fourth transistor Q4 produces a potential difference and is triggered to a conducting state to generate a third trigger signal and output the third trigger signal to the output circuit 19.

In the first preferred embodiment, the output circuit 19 as shown in FIG. 2 comprises an eleventh resistor R11, a twelfth resistor R12, a thirteenth resistor R13, a fourteenth resistor R14, a fifteenth resistor R15, a sixteenth resistor R16, a seventeenth resistor R17, an eighteenth resistor R18, a nineteenth resistor R19, a fifth transistor Q5, a sixth transistor Q6, a seventh transistor Q7, a first diode D1 and a first relay RY1, wherein a terminal of the eleventh resistor R11 is coupled between a collector of the fourth transistor Q4 and another terminal of the eighth resistor R8, and a terminal of the twelfth resistor R12 is coupled to the ground terminal, and a terminal of the thirteenth resistor R13 is coupled to a terminal of the eighth resistor R8, and a terminal of the fourteenth resistor R14 is coupled to the ground terminal, and a terminal of the fifteenth resistor R15 is coupled to another terminal of the thirteenth resistor R13, and a base of the fifth transistor Q5 is coupled between another terminal of the eleventh resistor R11 and another terminal of the twelfth resistor R12, and a collector of the fifth transistor Q5 is coupled between another terminal of the thirteenth resistor R13 and a terminal of the fifteenth resistor R15, and an emitter of the fifth transistor Q5 is coupled to another terminal of the fourteenth resistor R14.

A terminal of the sixteenth resistor R16 is coupled to a terminal of the thirteenth resistor R13, and a terminal of the seventeenth resistor R17 is coupled to the ground terminal, and a terminal of the eighteenth resistor R18 is coupled to another terminal of the sixteenth resistor R16, and a base of the sixth transistor Q6 is coupled to another terminal of the fifteenth resistor R15, and a collector of the sixth transistor Q6 is coupled between another terminal of the sixteenth resistor R16 and a terminal of the eighteenth resistor R18, and an emitter of the sixth transistor Q6 is coupled to another terminal of the seventeenth resistor R17.

A terminal of the nineteenth resistor R19 is coupled to the ground terminal, and a base of the seventh transistor Q7 is coupled between another terminal of the eighteenth resistor R18 and another terminal of the nineteenth resistor R19, and an emitter of the seventh transistor Q7 is coupled to the ground terminal, and a terminal of the first diode D1 is coupled to a terminal of the sixteenth resistor R16, and another terminal of the first diode D1 is coupled to a collector of the seventh transistor Q7, and a coil portion at a terminal of the first relay RY1 is coupled between a terminal of the sixteenth resistor R16 and a terminal of the first diode D1, and a coil portion at another terminal of the first relay RY1 is coupled between a collector of the seventh transistor Q7 and another terminal of the first diode D1, and an always opened contact point of the first relay RY1 is coupled to the first power output unit 2 (such as a battery), and a common contact point of the first relay RY1 is coupled separately to the automobile lights 5. If the third trigger signal is sent to the output circuit 19, the fifth transistor Q5, the sixth transistor Q6 and the seventh transistor Q7 in the output circuit 19 will be triggered to a conducting state to generate a fourth trigger signal.

Therefore, the third trigger signal of the driving circuit 17 is sent to the output circuit 19, the fifth transistor Q5, the sixth transistor Q6 and the seventh transistor Q7 sequentially to trigger the third trigger signal, such that the fifth transistor Q5, the sixth transistor Q6 and the seventh transistor Q7 are at a conducting state to generate and output the fourth trigger signal to the first relay RY1. In other words, the first relay RY1 is magnetically excited and electrically conducted, and the first power source is passed through the first relay RY1 and outputted to the automobile lights 5.

In FIGS. 1 and 2, two modes of the application of the first preferred embodiment will be described as follows:

In Mode (1), the automobile lights 5 are turned on automatically after a car is started.

Now, the voltage regulation circuit 11 receives the second power source which is an IGN and ACC power source, and the first input switch SW1 is an ignition switch in the car, and the automobile lights 5 will be turned on automatically when the car is started. If the first input switch SW1 is turned to an ignition position, the car will be started, and thus the driving circuit 17 is electrically conducted, and the third signal is inputted to the output circuit 19 through the driving circuit 17, and the third trigger signal is passed through the fifth transistor Q5, the sixth transistor Q6 and the seventh transistor Q7 to generate and output the fourth trigger signal to electrically conduct the first relay RY, such that the first power source is supplied through the first relay RY1 to the automobile lights 5 for the illumination.

In Mode (2), the automobile lights 5 are turned off automatically after the car is turned off.

The second power source is not inputted to the control circuit 1 (since the ignition switch is off, and the power source of the DC motor is disconnected), and the output circuit 19 has not triggered the third trigger signal to conduct the fifth to seventh transistors Q5~Q7, so that the first relay RY1 returns to the off position. This mode provides the function of turning off the automobile lights 5 automatically.

Figure 3:
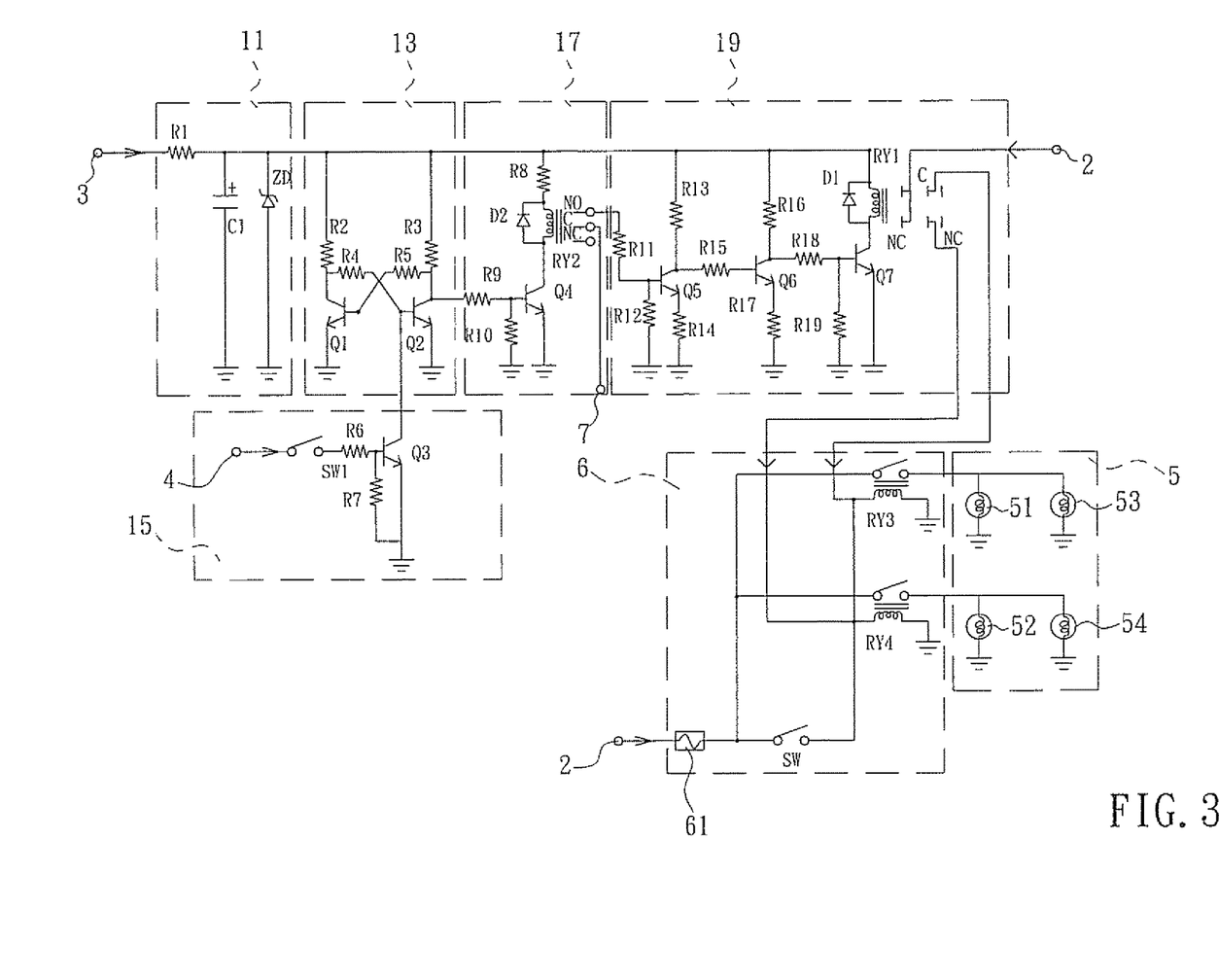
FIG. 3 is a schematic view of a control circuit for turning on/off automobile lights in accordance with a second preferred embodiment of the present invention.
Figure 4:
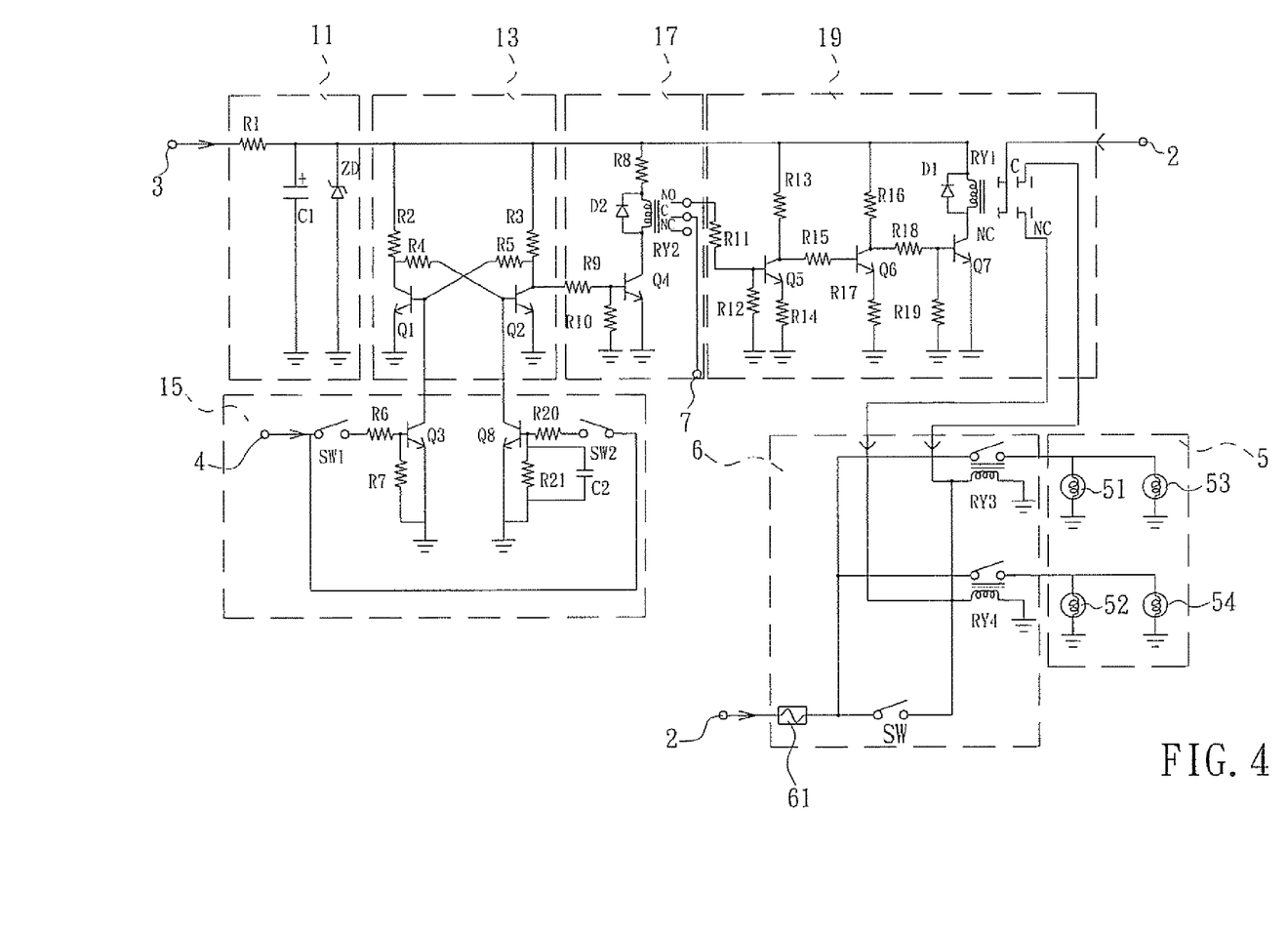
FIG. 4 is a schematic view of a control circuit for turning on/off automobile lights in accordance with a third preferred embodiment of the present invention.

Referring to FIGS. 3 and 4 for a second preferred embodiment of the present invention, the driving circuit 17 comprises a second diode D2 and a second relay RY2, wherein a terminal of the second diode D2 is coupled to another terminal of the eighth resistor R8, and another terminal of the second diode D2 is coupled to a collector of the fourth transistor Q4, and a terminal of a coil portion of the second relay RY2 is coupled to another terminal of the eighth resistor R8 and a terminal of the second diode D2, and another terminal of a coil circuit of the second relay RY2 is coupled between a collector of the fourth transistor Q4 and another terminal of the second diode D2, and a common contact point of the second relay RY2 is coupled to a fourth power output unit 7, and an always opened contact point of the second relay RY2 is coupled to the output circuit 19. If the third trigger signal is sent to the second relay RY2, or the second relay RY2 is magnetically excited and electrically conducted, a fourth power source (such as the power source of a DC motor) of the fourth power output unit 7 is outputted to the output circuit 19 through the second relay RY2, so that the third trigger signal is outputted to the second relay RY2, and the second relay RY2 is magnetically excited and electrically conducted, and the fourth power source is inputted to the output circuit 19 through the second relay RY2. In this embodiment, both of the fourth power source and the third trigger signal are used for triggering the fifth transistor Q5, the sixth transistor Q6 and the seventh transistor Q7.

To make it easier for our examiner to further understand the second preferred embodiment as shown in FIGS. 1 and 3, two modes of the applications in accordance with the second preferred embodiment are described as follows:

In Mode (1), the automobile lights 5 are turned on manually after a car is started.

Now, the voltage regulation circuit 11 receives the second power source which is an IGN and ACC power source, and the first input switch SW1 is installed in the car and operated separately with an ignition switch. After the car is started and the first input switch SW1 is turned on by a driver, the second relay RY2 in the driving circuit 17 is electrically conducted, and the fourth power source is inputted to the output circuit 19 through the second relay RY2, and the operation of the control circuit 1 is the same as Mode (1) of the first preferred embodiment, and thus will not be described here. However, if the car is turned off and then started again and a driver wants to turn on the automobile lights 5, the driver needs to switch the first input switch SW1 to turn on the automobile light 5.

In Mode (2), the automobile lights 5 are turned off automatically, when the car is turned off.

The operation of the control circuit 1 is the same as Mode (2) of the first preferred embodiment, and thus will not be described here. However, the fourth power source of the output circuit 19 is disconnected from the fifth to seventh transistors Q5~Q7.

In addition, the automobile lights 5 are controlled manually, and the first input switch SW1 is installed in the car. If the first input switch SW1 is turned on/off, the control circuit 1 will be operated in the same way as Mode (2) of the first preferred embodiment, and the first input switch SW1 is the same as the ignition switch installed in the car, and thus will not be described here.

Since the first input switch SW1 in accordance with the second preferred embodiment is an ignition switch, the automobile lights 5 will be turned on automatically after the car is started. However, some drivers may want to turn on the automobile lights 5 automatically without starting the car, and thus the inventor of the present invention provides an input trigger circuit 15 of a third preferred embodiment as shown in FIG. 4 for the control, and the input trigger circuit 15 is used in an instant high-beam switch PASS SW of the car, wherein the input trigger circuit 15 comprises a first input switch SW1, a second input switch SW2, a sixth resistor R6, a seventh resistor R7, a twentieth resistor R20, a twenty-first resistor R21, a second capacitor C2, a third transistor Q3 and an eighth transistor Q8, wherein the connection of the first input switch SW1, the sixth resistor R6, the seventh resistor R7 and the third transistor Q3 is the same as the input trigger circuit 15 of the first preferred embodiment, and thus will not be described here. The first input switch SW1 and the second input switch SW2 are instant high-beam switches PASS SW of the car. A terminal of the second input switch SW2 is coupled between a terminal of the first input switch SW1 and a third power output unit 4 (such as a battery ), and a terminal of the twentieth resistor R20 is coupled to another terminal of the second input switch SW2, and a terminal of the twenty-first resistor R21 is coupled to another terminal of the twentieth resistor R20, and both ends of the second capacitor C2 are disposed between both ends of the twenty-first resistor R21, and a base of the eighth transistor Q8 is coupled among another terminal of the twentieth resistor R20, a terminal of the twenty-first resistor R21 and a terminal of the second capacitor C2, and an emitter of the eighth transistor Q8, another terminal of the twenty-first resistor R21 and another terminal of second capacitor C2 are coupled to a ground terminal, and a collector of the eighth transistor Q8 is coupled between the second transistor Q2 and another terminal of the fourth resistor R4.

To make it easier for our examiner to understand the third preferred embodiment as shown in FIGS. 1 and 4, two modes of applications of the third preferred embodiment are described as follows:

In Mode (1), the automobile lights 5 are turned on manually and off automatically.

Now, the voltage regulation circuit 11 receives the second power source which is an IGN and ACC power source, and the first input switch SW1 and the second input switch SW2 are instant high-beam switches PASS SW of a car, and the automobile lights 5 can be turned on automatically when the car is started. If the car is started, and the instant high-beam switches PASS SW are turned to an instant high beam position, the operation of the instant high-beam switches PASS SW of the automobile lights 5 is the same as the electrically conducted input switches SW1, SW2, and the operation of the control circuit 1 is the same as Mode (1) of the second preferred embodiment, and thus will not be described here.

In Mode (2), the automobile lights 5 are turned on and off manually.

Now, the instant high-beam switch PASS SW is turned, so that the electric potential of the base of the first transistor Q1 is the same as the original electric potential, and thus the electric potential of the collector of the second transistor Q2 remains unchanged, and the electric potential of the base of the fourth transistor Q4 is lowered due to the delay of the twenty-first resistor R21 and the second capacitor C2, and the second transistor Q2 will not be electrically conducted, and the fourth to seventh transistors Q4~Q7, the first relay RY1 and the second relay RY2 will not be electrically conducted, and thus the automobile lights 5 will be turned off.

Figure 5:
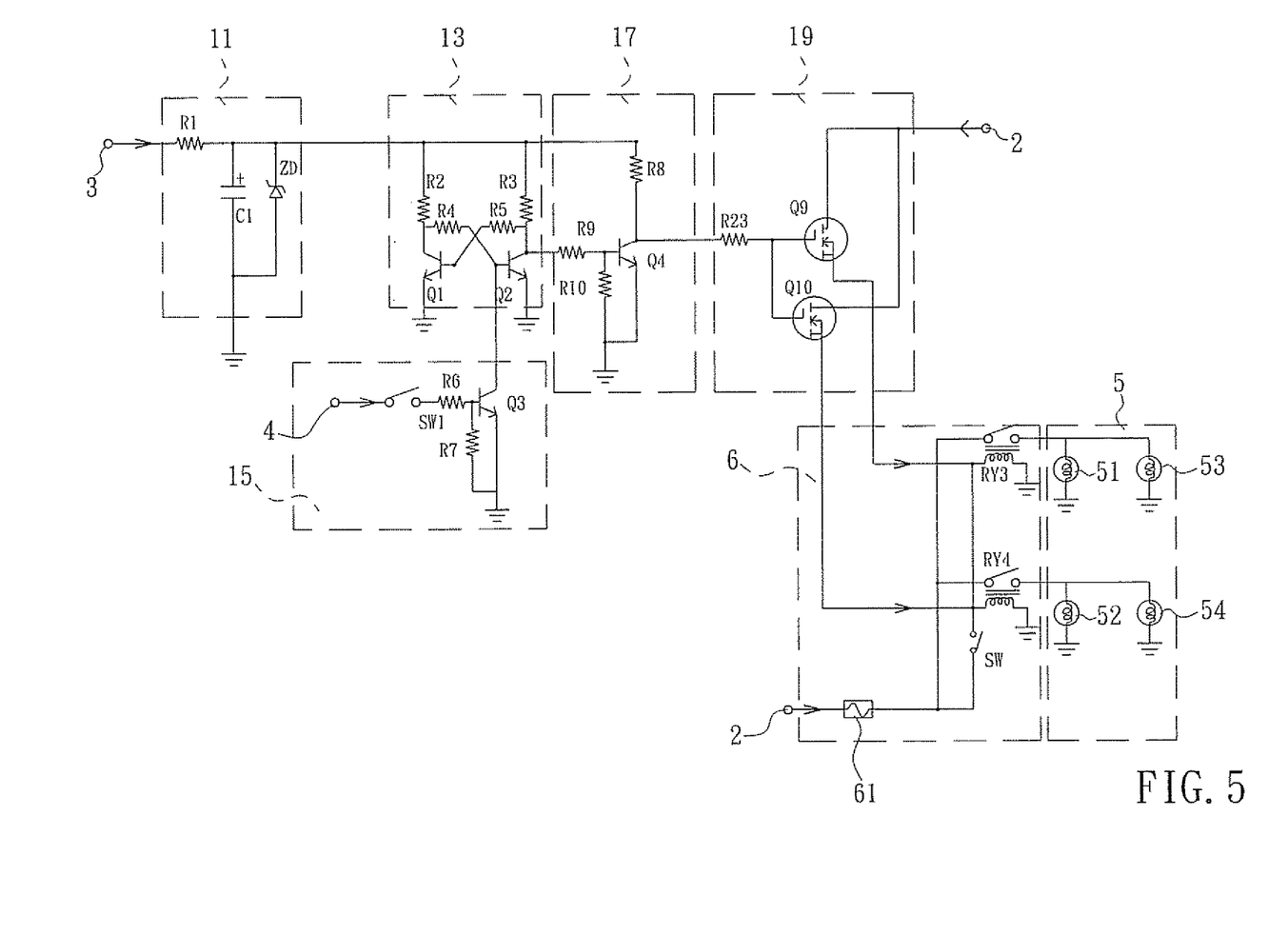
FIG. 5 is a schematic view of a control circuit for turning on/off automobile lights in accordance with a fourth preferred embodiment of the present invention.

Further, any car adopting an electronic sensor to start a car cannot use the aforementioned structure, and thus the inventor of the present invention further provides a control circuit 1 in accordance with a fourth preferred embodiment of the present invention. In FIGS. 1 and 5, the control circuit 1 is applied in a car adopting an electronic sensor for starting a car, wherein the voltage regulation circuit 11, the stable-state circuit 13, the input trigger circuit 15 and the driving circuit 17 are the same as the first preferred embodiment, and thus will not be described here. A terminal of the first resistor R1 of the voltage regulation circuit 11 is coupled to a second power output unit 3 (such as an electronic control unit (ECU) of an automatic controller for an electric generator of a car), and the first input switch SW1 is installed in the car, and a terminal of the first input switch SW1 is coupled between a terminal of the Zener diode ZD and a terminal of the second resistor R2. Since the terminal of the first input switch SW1 receives a second power source (ECU power source) or a third power source (such as a battery power source) to set the input trigger circuit 15 to a conducting state, and generate and output a first trigger signal to the stable-state circuit 13, such that the terminal of the first input switch SW1 is coupled to a third power output unit 4 (such as FIG. 4).

Further, the output circuit 19 comprises a twenty-third resistor R23, a ninth transistor Q9 and a tenth transistor Q10, wherein a terminal of the twenty-third resistor R23 is coupled between a collector of the fourth transistor Q4 and another terminal of the eighth resistor R8, and a gate of the ninth transistor Q9 is coupled to another terminal of the twenty-third resistor R23, and a drain of the ninth transistor Q9 is coupled to the first power output unit 2, and a source of the ninth transistor Q9 is coupled to the automobile lights 5, and a gate of the tenth transistor Q10 is coupled between another terminal of the twenty-third resistor R23 and a gate of the ninth transistor Q9, and a drain of the tenth transistor Q10 is coupled between the drain of the ninth transistor Q9 and the first power output unit 2, and a source of the tenth transistor Q10 is coupled to the automobile lights 5. If the third trigger signal is sent to the ninth transistor Q9 and the tenth transistor Q10, the ninth transistor Q9 and the tenth transistor Q10 are triggered to a conducting state, and the first power source of the battery is supplied to the automobile lights 5 through the ninth transistor Q9 and tenth transistor Q10 to produce lights for the illumination.

Two modes of applications in accordance with the fourth preferred embodiment as shown in FIGS. 1 and 5 are described as follows:

In Mode (1), the automobile lights 5 are turned on manually.

The control circuit 1 is installed in a car of a modern intelligent model, and the voltage regulation circuit 11 receives the second power source which is an ECU power source, and the first input switch SW1 is installed in the car and used separately with the sensor switch of the modern intelligent car. If the power of the second power output unit 3 (which is an automatic controller of an electric generator or an electronic control unit (ECU) is supplied to the control circuit 1 to trigger and electrically conduct the first input switch SW1 to input the third power source to the input trigger circuit 15. Now, the fourth transistor Q4 is triggered to a conducting state by the second trigger signal to generate and output the third trigger signal to the output circuit 19, such that the ninth transistor Q9 and the tenth transistor Q10 are triggered and electrically conducted to supply the first power source through the transistors Q9, Q10 to the automobile lights 5 for the illumination. Further, if a car is turned off and then started again and a driver wants to turn on the automobile lights 5, the driver has to start the first input switch SW1 again to turn on the automobile lights 5.

In Mode (2), the automobile lights 5 are turned off automatically.

When the engine is turned off, the second power output unit 3 is disconnected, and the second power source is not supplied to the control circuit 1, and thus the fourth transistor Q4, the ninth transistor Q9 and the tenth transistor Q10 are not triggered or electrically conducted, and the first power source cannot be supplied through the transistors Q9, Q10 to the automobile lights 5, and finally the lit automobile lights 5 will be turned off.

In FIGS. 2 to 5, the headlights of a general car are started by a control circuit, and the control circuit 1 is connected with a traditional output circuit 6 (such as a control circuit for starting the headlight of a general car), and the traditional output circuit 6 comprises an always closed protecting switch 61 (such as a fuse), an automobile light switch SW, a third relay RY3 and a fourth relay RY4, wherein a terminal of the always closed protecting switch is coupled to the first power output unit 2 (such as a battery), and a terminal of the automobile light switch SW, a terminal of the third relay RY3, and a terminal of the fourth relay RY4 are coupled separately to another terminal of the always closed protecting switch, and another terminal of the automobile light switch SW is coupled to a common contact point of the first relay RY1 and a terminal at a coil portion of the third relay RY3, and another terminal of the coil portion of the third relay RY3 and another terminal of the coil portion of the fourth relay RY4 are coupled to the ground terminal. Further, another terminal of the third relay RY3 is coupled to the automobile lights 5, and another terminal of the fourth relay RY4 is coupled to the automobile lights 5. If the ignition switch of a car is turned to a power supply position, the automobile light switch SW is conducted, and the first power source of the first power output unit 2 is supplied to a coil portion of the third relay RY3 and a coil portion of the fourth relay RY4 through the automobile light switch SW for magnetically exciting and electrically conducting the coil portion of the third relay RY3 and the coil portion of the fourth relay RY4, and the first power source is supplied through the automobile light switch SW, the third relay RY3 and the fourth relay RY4 to the automobile lights 5 for driving the automobile lights 5 to produce a light source for the illumination.

In the first to fourth preferred embodiments as shown in FIGS. 2 to 5, the automobile lights 5 include a first headlight 51, a second headlight 52, a first tail light 53 and a second tail light 54, wherein a terminal of the first headlight 51 is coupled to another terminal of the third relay RY3, and another terminal of the headlight 51 is coupled to the ground terminal, and a terminal of the second headlight 52 is coupled to another terminal of the fourth relay RY4, and another terminal of the second headlight 52 is coupled to the ground terminal, and a terminal of the first tail light 53 is coupled between another terminal of the third relay RY3 and a terminal of the first headlight 51, and a terminal of the second tail light 54 is coupled between another terminal of the fourth relay RY4 and a terminal of the second headlight 52. If the first power source is outputted to the automobile lights 5, the headlights 51, 52 and the tail lights 53, 54 will produce light sources simultaneously for the illumination. On the other hand, the light sources of the headlights 51, 52 and the tail lights can be turned off simultaneously.

The aforementioned second to fourth preferred embodiments can overcome the situation that cannot be handled by the first preferred embodiment. In the first preferred embodiment, if the power source of the first power output unit 2 (such as a battery) of a car is sufficient to start the car, then the automobile lights 5 are situated at an automatically lit state, and the first power source is supplied to each electronic devices in the car, such that the current of the first power source of the first power output unit 2 is split, and the power of the first power source is insufficient to start the motor and cause a problem of operating the car engine. Similarly, the power supply of the first power output unit 2 (such as a battery) in accordance with the second to fourth preferred embodiments are sufficient, so that if the car is started, the automobile lights 5 are electrically conducted by switching the input switches SW1, SW2 to turn on the headlights for the illumination. The invention can reduce the load of using the first power source and supply a sufficient first power source to start the motor for the operation of the car engine.

What is claimed is:

1. A control circuit for turning on/off automobile lights, being coupled between a first power output unit, a second power output unit, a third power output unit and a plurality of automobile lights, and comprising:

a voltage regulation circuit, coupled to the second power output unit, for receiving a second power source of the second power output unit;

an input trigger circuit, coupled to the third power output unit, such that when the input trigger circuit is conducted, a third power source of the third power output unit triggers the input trigger circuit to generate and output a first trigger signal;

a stable-state circuit, coupled to the voltage regulation circuit and the input trigger circuit respectively, for being triggered by the first trigger signal to generate and output a second trigger signal;

a driving circuit, coupled to the stable-state circuit, for being triggered by the second trigger signal to generate and output a third trigger signal; and an output circuit, coupled between the driving circuit, the first power output unit and the automobile lights, such that when the output circuit is triggered by the third trigger signal into a conductive state, a first power source of the first power output unit is outputted to the automobile lights through the output circuit, and when the second power source is interrupted, the output circuit interrupts the first power source outputted to the automobile lights.

2. The control circuit for turning on/off automobile lights of claim 1, wherein the voltage regulation circuit comprises:

a first resistor, having a terminal coupled to the second power output unit; a first capacitor, having a terminal coupled to another terminal of the first resistor, and another terminal of the first capacitor coupled to a ground terminal; and a Zener diode, having a terminal coupled among the another terminal of the first resistor, the terminal of the first capacitor, and the stable-state circuit, and another terminal of the Zener diode coupled to the ground terminal.

3. The control circuit for turning on/off automobile lights of claim 2, wherein the stable-state circuit comprises:
a second resistor, having a terminal coupled between the terminal of the Zener diode and the driving circuit;
a third resistor, having a terminal coupled between another terminal of the second resistor and the driving circuit;
a fourth resistor, having a terminal coupled to the another terminal of the second resistor;
a fifth resistor, having a terminal coupled between another terminal of the third resistor and the driving circuit;
a first transistor, having a collector coupled between the another terminal of the second resistor and the terminal of the fourth resistor, a base coupled to another terminal of the fifth resistor, and an emitter coupled to the ground terminal; and
a second transistor, having a collector coupled among the another terminal of the third resistor, the terminal of the fifth resistor and the driving circuit, a base coupled between the another terminal of the fourth resistor and a terminal of the input trigger circuit, and an emitter coupled to the ground terminal.

4. The control circuit for turning on/off automobile lights of claim 3, wherein the input trigger circuit comprises:
a first input switch, having a terminal coupled to the third power output unit; a sixth resistor, having a terminal coupled to another terminal of the first input switch; a seventh resistor, having a terminal coupled to another terminal of the sixth resistor, and another terminal of the seventh resistor coupled to the ground terminal; and
a third transistor, having a base coupled between the another terminal of the sixth resistor and the terminal of the seventh resistor, an emitter coupled to the ground terminal, and a collector coupled between the second transistor and the another terminal of the fourth resistor.

5. The control circuit for turning on/off automobile lights of claim 4, wherein the driving circuit comprises:
an eighth resistor, having a terminal coupled to the terminal of the third resistor and the output circuit;
a ninth resistor, having a terminal coupled to the collector of the second transistor, and another terminal coupled between the another terminal of the third resistor and the terminal of the fifth resistor;
a tenth resistor, having a terminal coupled to the ground terminal; and a fourth transistor, having a base coupled between the another terminal of the ninth resistor and another terminal of the tenth resistor, an emitter coupled to the ground terminal, and a collector coupled between another terminal of the eighth resistor and the output circuit.

6. The control circuit for turning on/off automobile lights as recited in claim 5, wherein the output circuit comprises:
an eleventh resistor, having a terminal coupled to the collector of the fourth transistor and the another terminal of the eighth resistor;
a twelfth resistor, having a terminal coupled to the ground terminal;
a thirteenth resistor, having a terminal coupled to the terminal of the eighth resistor;
a fourteenth resistor, having a terminal coupled to the ground terminal;
a fifteenth resistor, having a terminal coupled to another terminal of the thirteenth resistor;

a fifth transistor, having a base coupled between another terminal of the eleventh resistor and another terminal of the twelfth resistor, a collector coupled between another terminal of the thirteenth resistor and the terminal of the fifteenth resistor, and an emitter coupled to another terminal of the fourteenth resistor;
a sixteenth resistor, having a terminal coupled to the terminal of the thirteenth resistor;
a seventeenth resistor, having a terminal coupled to the ground terminal;
an eighteenth resistor, having a terminal coupled to another terminal of the sixteenth resistor;
a sixth transistor, having a base coupled to another terminal of the fifteenth resistor, a collector coupled between the another terminal of the sixteenth resistor and the terminal of the eighteenth resistor, and an emitter coupled to another terminal of the seventeenth resistor;
a nineteenth resistor, having a terminal coupled to the ground terminal;
a seventh transistor, having a base coupled between another terminal of the eighteenth resistor and another terminal of the nineteenth resistor, and an emitter coupled to the ground terminal;
a first diode, having a terminal coupled to the terminal of the sixteenth resistor, and another terminal coupled to the collector of the seventh transistor; and
a first relay, including a coil portion having a terminal coupled between the terminal of the sixteenth resistor and the terminal of the first diode, another terminal coupled to between the collector of the seventh transistor and the another terminal of the first diode, an always opened connecting point coupled to the first power output unit, and a common contact point coupled respectively to the automobile lights.

7. The control circuit for turning on/off automobile lights as recited in claim 5, wherein the driving circuit further comprises:
a second diode, having a terminal coupled to the another terminal of the eighth resistor, and another terminal coupled to the collector of the fourth transistor; and
a second relay, including a coil portion having a terminal coupled between the another terminal of the eighth resistor and the terminal of the second diode, another terminal coupled between the collector of the fourth transistor and the another terminal of the second diode, a common contact coupled to the fourth power output unit, and an always opened contact point coupled to the output circuit.

8. The control circuit for turning on/off automobile lights as recited in claim 5, wherein the output circuit comprises:
a twenty-third resistor, having a terminal coupled between the collector of the fourth transistor and the another terminal of the eighth resistor;
a ninth transistor, having a gate coupled to another terminal of the twenty-third resistor, a drain coupled to the first power output unit, and a source coupled to the automobile lights; and
a tenth transistor, having a gate coupled between the another terminal of the twenty-third resistor and the gate of the ninth transistor, a drain coupled between the drain of the ninth transistor and the first power output unit, and a source coupled to the automobile lights.

9. The control circuit for turning on/off automobile lights as recited in claim 8, wherein a terminal of the first input switch is coupled between a terminal of the Zener diode and a terminal of the second resistor.

10. The control circuit for turning on/off automobile lights as recited in claim 3, wherein the input trigger circuit comprises:

a first input switch, having a terminal coupled to the third power output unit; a sixth resistor, having a terminal coupled to the another terminal of the first input switch; a seventh resistor, having a terminal coupled to another terminal of the sixth resistor, and another terminal coupled to the ground terminal;

a third transistor, having a base coupled between the another terminal of the sixth resistor and the terminal of the seventh resistor, an emitter coupled to the ground terminal, and a collector coupled between the second transistor and the another terminal of the fourth resistor;

a second input switch, having a terminal coupled between the terminals of the first input switch and the third power output unit;

a twentieth resistor, having a terminal coupled to another terminal of the second input switch;

a twenty-first resistor, having a terminal coupled to another terminal of the twentieth resistor;

a second capacitor, having both terminals disposed between both terminals of the twenty-first resistor; and an eighth transistor, having a base coupled among another terminal of the twentieth resistor, the terminal of the twenty-first resistor and the terminal of the second capacitor, an emitter coupled to the another terminal of the twenty-first resistor and another terminal of the second capacitor being coupled to the ground terminal, and a collector coupled between the base of the second transistor and the another terminal of the fourth resistor.

\* \* \* \* \*